United States Patent [19]

Palasz

[11] Patent Number: 5,654,360
[45] Date of Patent: Aug. 5, 1997

[54] AQUEOUS COATING OF ORGANIC SOLVENT-SOLUBLE SILICON POLYMER AND DISPERSION POLYMER

[75] Inventor: Peter David Palasz, Taplow, United Kingdom

[73] Assignee: Imperial Chemical Industries PLC, London, England

[21] Appl. No.: 572,614

[22] Filed: Dec. 14, 1995

[30] Foreign Application Priority Data

Dec. 16, 1994 [GB] United Kingdom ............ 9425436

[51] Int. Cl.$^6$ ............ C08K 5/04; C08K 5/05; C08L 43/04; C08L 63/02
[52] U.S. Cl. ............ 524/521; 523/403; 523/408; 523/412; 523/421; 524/501; 524/507; 524/513
[58] Field of Search ............ 524/501, 507, 524/513, 521; 523/403, 408, 412, 421

[56] References Cited

U.S. PATENT DOCUMENTS

| | | | |
|---|---|---|---|
| 4,785,035 | 11/1988 | Pailuel et al. | 524/101 |
| 5,204,404 | 4/1993 | Werner, Jr. et al. | 524/501 |
| 5,258,443 | 11/1993 | Nield et al. | 524/501 |
| 5,364,901 | 11/1994 | Nield et al. | 524/506 |
| 5,399,601 | 3/1995 | Kusumi et al. | 524/188 |

OTHER PUBLICATIONS

CAPLUS accesssion No. 1981:48917 for Japanese Patent No. 55-110170, Dainippon Ink and Chemicals, Inc. Aug. 1980.

CAPLUS accession No. 1990:593579 for Japanese Patent No. 2-117977, Dainippon Ink and Chemicals, Inc. May 1990.

WPAT accession No. 80-72232C/41 for Japanese Patent No. 55-110170, Dainippon Ink Chem KK Aug. 1980.

WPAT accession No. 90-325192/43 for Japanese Patent No. 2-233709, Kansai Paint KK Sep. 1990.

*Primary Examiner*—Robert E. Sellers
*Attorney, Agent, or Firm*—Thomas M. Schmitz

[57] ABSTRACT

The invention provides a water-based coating composition in two pack form comprising:

i) in a first pack a substantially non-aqueous solution of a silicon-containing polymer which is soluble in water miscible organic solvents and essentially soluble in aqueous media, the silicon groups on the polymer being of formula (1):

$$-SiR^1_aR_{3-a} \qquad (1)$$

in which a is 0 to 2, $R^1$ is C1-6 alkyl and R is OH or a hydrolysable group, and ii) in a second pack a polymer in dispersion in an aqueous liquid carrier for the composition, where the non-volatile binder solids content of the composition is at least 5% by weight and the molar concentration of silicon in the composition is greater than 0 and less than 0.5.

26 Claims, No Drawings

AQUEOUS COATING OF ORGANIC SOLVENT-SOLUBLE SILICON POLYMER AND DISPERSION POLYMER

The present invention relates to a water-based coating composition in two-pack form containing a silane polymer. The invention also relates to a process of coating using the coating composition, and to a coated substrate obtainable by the coating process.

Water-based dispersions or solutions of polymers having hydrolysable silane groups are known as shown, for example, in GB-A-2215339, EP-A-276469 and U.S. Pat. No. 4384013. Coating compositions containing such groups are known to exhibit excellent solvent resistance due to strong silane bonding when cured. A problem with compositions containing aqueous dispersions or solutions of polymers having such groups is that only low levels of silane can be incorporated into the polymer if the composition is to remain stable for any useful period of time. Thus, the silane level must be kept low if there is to be little or no deterioration of the composition prior to use. However, the use of low levels of hydrolysable silane groups in the polymer leads to a low level of cross-linking in films formed from these compositions, which in turn leads to poor film properties such as poor water resistance and poor organic solvent resistance.

In addition, whether the silane containing polymer is in dispersion or solution in the liquid medium of the coating composition affects the maximum level of the polymer that can be present in the composition. For reasons well known in the art, it is desirable for a coating composition to have a high non-volatile solids content. Coating compositions containing the polymer in dispersion in aqueous media can have high levels of polymer, but the level of silane must be kept low if the composition is to remain chemically stable. Coating compositions containing the polymer dissolved in aqueous media on the other hand can contain higher levels of silane but only low levels of polymer if they are to remain chemically stable.

EP-A-485,067 discloses a one-pack curable coating composition comprising a mixture of an aqueous dispersion of a first silane containing polymer and an aqueous solution or dispersion of second silane containing polymer having a molecular weight less than 20,000, in the presence of a polyethylene glycol compound. The composition contains only relatively low effective levels of silane functionality, in order to achieve one pack stability. A slightly higher level is achievable due to the presence of the polyethylene glycol compound.

Further, EP-A-485,057 discloses a "one pack" curable cationic coating composition comprising a mixture of an aqueous dispersion of a first silane containing polymer, and a solution or dispersion of a second silane containing polymer. The second polymer additionally comprises covalently bonded cationic hydrophilic groups in a sufficient amount to render the second polymer soluble or self dispersable in aqueous medium.

However, a problem with the systems described in EP-A-485,067 and EP-A-485,057 is that it is only possible to include relatively low levels (or low functionality) of silane solution polymer in the system to retain chemical stability, and this in turn limits the quality of film obtainable.

EP-A-267,698 discloses a "two-pack" curable paint composition comprising a silane functional acrylic polymer component and a silane functional oligomeric hardener where each component is dissolved in a non-aqueous solvent. In practice a catalyst such as dibutyl tin dilaurate is required to catalyse the silane cross-linking reaction. The use of an organic carrier as opposed to water enables higher levels of silane to be obtained in the resultant composition. However, organic solvent based formulations and formulations containing tin compounds are undesirable because they have a harmful influence on the environment. Also the polymers used in this system are not water miscible.

Accordingly, an object of the present invention is to provide a water-based coating composition that has a usable pot-life and yet has a relatively high silane content so that films with good properties are formed.

Thus, according to a first aspect of the invention, there is provided a water-based coating composition in two pack form comprising: i) a first pack comprising a substantially non-aqueous solution of a silicon containing polymer which is soluble in water miscible organic solvents and essentially soluble in aqueous media where the silicon groups on the polymer have the formula (1) below:

$$—SiR^1_a R_{3-a} \quad (1)$$

in which a is 0 to 2, $R^1$ is Cl-6 alkyl, and R is OH or a hydrolysable group, and ii) a second pack comprising a polymer dispersed in an aqueous liquid carrier for the composition, where the non-volatile binder solids content of the composition is at least 10% by weight and the molar concentration of silicon in the composition is greater than 0 and less than 0.5.

Preferably, R comprises few, or even no OH groups, and may therefore in a preferred embodiment comprises predominantly hydrolysable groups, in particular alkoxy groups such as ethoxy and methoxy groups. $R^1$ is also preferably methyl or ethyl groups.

The substantially non-aqueous solution polymer pack of the two pack composition according to the invention comprises less than 5% by weight water, preferably less than 2% by weight water, more preferably less than 0.1% by weight water. A particular advantage of the two pack composition according to the invention is that, if the solution silicon polymer can be retained in its unhydrolysed state (i.e. it has not had significant contact with water) it will have an enhanced ability, at least in the short term, to cross link with other polymers in the composition, and thereby provide improved coatings.

The water-based mixed compositions according to the present invention can remain stable for a number of hours, even when the silane concentration is close to the specified maximum level of 0.5. Moreover, the present compositions can be made to form cured films, which show improvements over films formed from the individual polymer components in that they are hard yet possess a degree of flexibility which prevents them from cracking. Films cure rapidly at room temperature and also have excellent adhesion to substrates.

Preferably the molar concentration of silicon in the composition is at least 0.02, more preferably from 0.1 to 0.4. By molar concentration of silicon in the composition is meant the molar composition in the mixed solution, and not just its concentration in one or other of the packs.

In the two-pack formulation of the invention, the water-based composition described comprises the aqueous polymer dispersion in a first pack and the silicon containing polymer dissolved in a substantially non-aqueous organic solvent which is essentially soluble in aqueous media in a second pack. In use, the dispersion polymer and solution polymer are mixed together to form a composition having a molar concentration of silicon of less than 0.5.

In an envisaged aspect of the invention, it is possible to utilize the invention by providing a single pack containing a substantially non-aqueous solution of the silicon containing solution polymer as described herein. This can be sold separately, and can be subsequently combined by a user with a conventional dispersion polymer coating composition in order to boost the performance of the dispersion polymer coating composition.

The resultant mixture is usable for at least one hour, and in some cases usable after eight hours. This provides sufficient time for a user to apply the composition to a substrate after the polymeric components have been mixed.

The use of the two-pack formulation makes it possible to achieve a relatively high concentration of silane in the final composition which has previously not been possible with aqueous based compositions. Moreover, the present composition does not require the presence of a catalyst to form cured films, and can conveniently be catalyst free. Alternatively, a catalyst can be added in some cases to promote curing.

In addition to a high silane concentration, the composition of the present invention may contain a high binder solids content, eg up to 70% or more, which makes it particularly suitable for use as a surface coating. By 'binder solids' is meant the film-forming portion of the present composition, comprising polymeric components. Generally, pigments, extenders and non-polymeric chemical additives such as stabilisers are not considered part of the binder solids. In this disclosure, the term binder solids therefore includes the solution polymer and the dispersion polymer.

The aqueous medium of the mixed composition is one which predominantly comprises water. Because the silane containing solution polymer is made in a substantially non aqueous organic solvent, the liquid medium in the resultant mixed composition will necessarily contain some organic solvent. However, the liquid medium is of the mixed composition preferably at least 60% by weight water, and more preferably at least 75% by weight.

The mixed coating composition contains at least 5%, more preferably at least 10% by weight, even more preferably at least 20% by weight of non-volatile binder solids. Preferably the coating composition contains less than 95%, more preferably less than 70% by weight of non-volatile binder solids.

The solution polymer preferably contains a maximum non-volatile (NV) binder solids content of 80 to 100% by weight and a corresponding maximum organic solvent content of 0 to 20% by weight.

The solution polymer according to the invention preferably has a silicon concentration of 0.5–8%, more preferably 1–7% by weight.

In addition, it is a preferred embodiment that the substantially non-aqueous solvent of the solution polymer contains a relatively large amount (eg. 70% by weight or more) of an alcohol which is soluble in water. Such alcohols include short chain (eg $C_{1-6}$) alcohols, for example ethanol or methanol, and the Dowanol (trade mark) solvents (eg Dowanol PM). Such alcohols are believed to contribute to the chemical stability of the solution polymer in the pack, and therefore improve the shelf life of the solution polymer pack.

In a further preferred aspect of the invention, the solution polymer may additionally comprise from 1–10% by weight of the solution polymer of a compound containing a poly (ethylene glycol) moiety. Preferably the solution comprises from 2 to 6% by weight of the solution polymer of a compound containing a poly (ethylene oxide) moiety.

Preferably the polyethylene oxide moiety has a molecular weight between 200 and 5000, and more preferably between 350 and 2500.

One particularly suitable compound is methoxypolyethylene oxide (2000) methacrylate, commercially available as Meo PEG 2000 MA from Inspec Ltd.

The weight average molecular weight of the solution polymer is preferably from 500 to 300,000. All molecular weights disclosed herein are determined by gel permeation chromatography using a Walters (Trade Mark) modular system with a polystyrene standard and tetrahydrofuran as the eluting solvent.

The solution polymer is preferably an addition vinyl polymer comprising structural units and functional units. The structural units are conveniently derived from vinyl monomers which do not have reactive groups to silane functionality.

The structural units may be acrylic monomers which do not have reactive groups such as C1–10 alkyl esters of acrylic or methacrylic acid such as methylmethacrylate, ethylmethacrylate, propylmethacrylate, butylmethacrylate, pentylmethacrylate, hexylmethacrylate, ethylacrylate, propylacrylate, butylacrylate, pentylacrylate, hexylacrylate, octylacrylate and 2-ethylhexylacrylate. Preferably the structural units are selected from C1–6 alkyl esters of acrylic or methacrylic acid, and most preferably are C1–4 alkyl esters of acrylic and methacrylic acids.

In addition to or instead of the acrylic monomers described above, other non-silane containing polymerizable monomers can be used for the purpose of achieving desired properties such as hardness and appearance. Examples of such other monomers are styrene, acrylamide, acrylonitrile and glycidyl methacrylate.

The structural units can also comprise a small proportion of hydroxyl functional polymerized monomers in an amount of up to 5% by weight on the weight of the solution polymer. Suitable monomers include hydroxy C2–6 alkyl acrylates or methacrylates. Examples of hydroxyl functional monomers are hydroxy ethyl acrylate, hydroxy propyl acrylate, hydroxy butyl acrylate and hydroxy ethyl methacrylate. The hydroxy functional groups can react with silane groups in the solution polymer to produce more bonding in the composition although low levels are preferred to avoid gelation.

The structural units preferably form 50 to 90% by weight based on the weight of the solution polymer.

Other useful polymers include silane functional polyurethanes, polyesters and epoxy polymers, which are known in the art.

Thus, the actual amount and type of structural units are chosen to provide the desired polymer glass transition temperature (Tg) as calculated by the Fox equation. In general, the solution polymer has a Tg of from −20° to 80° C., preferably from −5° to 40° C.

In formula (1) above $R^1$ is preferably C1–3 alkyl, most preferably methyl or ethyl. The hydrolysable group is one which can be hydrolysed to give a hydroxyl group on the silicon atom in the presence of water. Examples of suitable hydrolysable groups are C1–6 alkoxy, C2–4 alkanoyl, enolate and oxime. Preferably R is C1–6 alkoxy, particularly methoxy or ethoxy.

Examples of useful functional monomers are 3(trimethoxysilyl) propyl methacrylate, 3(dimethoxymethyl silyl) propyl methacrylate, 2-(3-cyclohexenyl) ethyltriethoxysilane, 3-butenyl triethoxyoxysilane, vinyl trialkoxy silanes such as vinyl trimethoxy silane and vinyl triethoxy silane, and cationic hydrophilic units that are derived from monomers which carry cationic hydrophilic groups or acid addition salt forming groups. An example of a useful monomer having an acid addition salt forming group is 2-aminoethyl methacrylate.

Examples of useful cationic polymers, and their synthesis, are more fully described in EP-A-485,057 (Imperial Chemical Industries plc) on pages 5-8, though in the context of the invention these polymers are only included in the non-aqueous solution polymer component. Such suitable polymers for the manufacture of the cationic polymer are derived from epoxy resins, acrylic epoxy polymers and polyesters.

In a preferred embodiment of the invention, the polymer is a result of the reaction between an epoxy resin/polymer and an amino silane. Suitable epoxy resins include vinyl or acrylic polymers containing glycidyl groups, or epoxy resins based on bisphenol A/epichlorohydrin or phenol formaldehyde/epichlorohydrin resins which are known in the art, and commercially available. Suitable amino silanes include gamma-amino propyl triethoxysilane, gamma aminopropylmethyl dimethoxy silane, and N-methyl gamma amino propyl trimethoxysilane.

Preferably the functional monomers containing the silane groups contribute from 5 to 30% by weight of the weight of the solution polymer.

The solution polymer comprises water solubilising groups in an amount so as to render the solution polymer essentially soluble or dispersable in the aqueous media. The solution polymer may be partly in solution and partly in dispersion in the aqueous medium. The water solubilising groups may comprise anionic, cationic or nonionic groups as desired, in sufficient amounts to render the solution polymer soluble, by choosing the type of the monomers. The cationic groups can be cationic quaternary ammonium groups. The monomers containing the water solubilising groups may contribute from 5 to 30% by weight on the solution polymer.

Examples of suitable acid water solubilising groups are carboxylic acid groups, sulphonic acid groups and phosphoric acid groups. Preferably the acid groups are carboxylic acid groups such as methacrylic acid, acrylic acid, itaconic acid or fumaric acid. It is preferable to react the acid group with an organic or inorganic alkaline substance in order to fully dissociate the acid groups in an amount sufficient to cause the polymer to be soluble in water as is well known in the art.

Examples of suitable cationic water solubilising groups are quaternary ammonium groups or acid addition salt groups. Examples of acid addition salt groups are protonated amine groups and protonated thioether groups.

Examples of suitable nonionic hydrophilic groups are pyrrolidone groups, hydroxyl groups and poly(ethylene oxide) units with a molecular weight of from 200 to 2000.

In preferred embodiments the solution polymer may contain a mixture of anionic and nonionic groups, or a mixture of cationic and nonionic groups.

The solution polymer may also contain up to 5% by weight of a chain transfer agent. The chain transfer agent is used to adjust the molecular weight and the reactivity of the polymer. It is preferred to use a silane chain transfer agent. Examples of suitable chain transfer agents are alkyl mercaptans such as gamma-mercapto propyl trimethoxy silane and octylmercaptan. Multi-functional chain transfer agents such as pentaerythritol-tetra-mercapto-propionate may also be used.

The dispersed polymer preferably contains a maximum NV binder solids content of 60% by weight and has a corresponding minimum water content of 40% by weight. A typical dispersed polymer contains a NV binder solids content of 40 to 55% by weight, preferably 50% by weight.

The dispersed polymer can be made up of the same structural units as described above for the solution polymer. Optionally it may contain a polyfunctional monomer such as divinyl benzene, ethylene glycol dimethacrylate, allyl methacrylate or pentaerythritol triacrylate. A preferred monomer is allyl methacrylate used at a level of up to 6%, or more preferably at a level of up to 4%.

It may also contain a low level of a monomer containing a silane group according to formula (1) above, which can also cross link in the cured film. It can also be in the form of a microgel. Preferably the dispersed polymer contains from 0 to 10% by weight of silane monomer, more preferably from 0.5 to 6%, and most preferably from 1 to 4%. The dispersed polymer preferably contains up to 1% by weight of silicon, more preferably 0.05–0.5% by weight of silicon.

The dispersed polymer may also contain water solubilising groups as described above to render it dispersable in the aqueous media.

In a preferred embodiment, the aqueous polymer dispersion can additionally comprise up to 10% by weight of the dispersion polymer solution. The presence of the solution polymer in the dispersion polymer pack may act as a dispersant for the dispersion polymer, and any pigment in the composition. As such, it may be possible to make the dispersion polymer pack with a reduced amount, or even no additional dispersant.

A surfactant may be associated with or covalently bonded to the dispersed polymer in order to stabilise the polymer particles in the aqueous media. A conventional anionic, cationic or non-ionic surfactant may be used. Preferably it is an anionic or non-ionic surfactant for use with anionic or non-ionic solution polymers for colloidal stability of the final composition. Examples of suitable anionic surfactants are alkyl sulphonates. Examples of suitable non-ionic surfactants are nonyl phenol ethers and alkyl ethers of poly (ethylene oxide).

The size of the dispersed polymer particles may be from 40 to 400 nm, preferably from 40 to 200 nm.

The dispersed polymer may have a Tg of from −20° to 80° C.

The final composition suitably contains up to 80%, preferably 10 to 60%, by weight of NV binder solids and 40 to 90% by weight of liquid carrier. A typical composition having a 1:1 weight ratio of solution polymer to dispersion polymer may contain a NV binder solids content of between 30 and 35%.

In the composition, the weight ratio of the solution polymer to the dispersion polymer may be from 20:1 to 1:20, more preferably generally in the region 4:1 to 1:2. For a stable composition which has a high solids content, ie greater than 20%, the levels of the two types of polymer in the composition are dependent on the level of silane functional units in the solution polymer. Thus, for example when the silane functional units are present in an amount of 5 % by weight on the solution polymer, the weight ratio of the solution polymer to the dispersed polymer may be from 9:1 to 1:1, more preferably from 2:8 to 7:3. When the silane functional units are present in an amount of 15% by weight on the solution polymer, the weight ratio of solution polymer to dispersed polymer may be from 9:1 to 3:7, more preferably from 7:3 to 3:7. When the silane functional units are present in an amount of 30% by weight on the solution polymer, the weight ratio of the solution polymer to the dispersed polymer is preferably from 2:8 to 7:3.

It has been found that compositions containing both types of polymers and having a silicon molar concentration of greater than 0 and less than 0.5 form films exhibiting desirable properties such as good solvent resistance and hardness.

A further embodiment of the present invention is a process of preparing the composition described above. The process comprises forming a silicon containing solution polymer in a water-miscible organic solvent which is soluble in aqueous media, forming a aqueous polymer dispersion, and mixing or blending the two polymers, whereby the molar concentration of silicon in the final blend is less than 0.5.

The solution polymer can be made by conventional methods such as by mixing together a monomer mixture with an initiator and slowly adding the mixture to a water miscible solvent which is maintained at a suitable reaction temperature. Suitable polymerisation initiators include azobis diisobutyronitrile and tertiary butyl peroxy-2-ethyl hexanoate.

The use of a substantially non-aqueous organic solvent for the polymer solution avoids hydrolysis and condensation of the silane groups during the polymerization process which can result in deterioration or gelation of the silane reactivity. The organic solvent may be any that is easily miscible in water and is a solvent for the polymer. Examples are a glycol ether such as propylene glycol monoethyl ether (available as Dowanol PM from Dow Chemicals), ethylene glycol monobutyl ether (available as Butyl Cellosolve from Union Carbide), an alkyl alcohol such as propan-1-ol and butan-1-ol, and N-methyl pyrrol idone. They are used alone or in combination.

The dispersion polymer is made by conventional emulsion polymerisation procedures in the preferred process, the monomers are slowly fed into the aqueous medium together with a surfactant and a polymerisation initiator such as hydrogen peroxide or ammonium persulphate or a mixture of tertiary butyl hydroperoxide, or a mixture of sodium metabisulphite and ammonium persulphate, or a mixture of hydrogen peroxide and ascorbic acid.

The resultant mixture is stirred during the addition of the initiator and the monomers so as to form an emulsion. The temperature of the reaction mixture is maintained sufficiently high so as to cause polymerisation of the monomers, for example between 30° and 100° C.

The composition can also comprise other conventional components such as pigments, dispersants, fillers, thickeners, biocides UV stabilisers, curing agents cross linkers, catalysts, surfactants, dispersants, solvents, and other film forming polymers, in particular epoxy resins.

A further embodiment of the present invention is directed to a process of coating a substrate using the coating composition comprising the steps of: (a) applying a layer of a curable composition as herein described to the surface of a substrate, and (b) allowing or causing the layer to cure.

The curable composition can be applied to a substrate by conventional means such as brushing, roller-coating, spraying or dipping. Suitable substrates include steel, aluminium, wood, plastic and glass. The composition finds particular use in all aspects of the coating of automobiles, including application of primer or surfacer coats, base coats, and clear coats. The composition can also be applied over a suitable base coat or undercoat, for example as a topcoat. The layers may be applied wet-on-wet, ie, where a second coat is applied without curing or completely drying the previous coat. The coated substrate can then be dried under ambient or elevated temperatures to allow simultaneous curing of both coats.

The layer can be cured either by allowing the aqueous phase to evaporate at room temperature or by heating, for example to 150° C. for 20 to 60 minutes, more preferably 50°–70° C. for 30–70 minutes. The layer can also force cured by the use of enhanced airflow over the surface of the film from a spray Sun, or from an Aqua Dry (trade mark) unit, or from any other suitable equipment, at either ambient or elevated temperatures.

Preferred coating compositions include where the composition is a clear coat composition, in which case it conveniently has a non-volatile binder solids content of 30–70% by weight, and as a primer composition, in which case it may have a non-volatile binder solids content of 20–50% by weight.

A further embodiment of the present invention is a coated substrate having adhered thereto a coating according to the above composition.

The invention will now be further described by means of the following examples in which parts are given by weight.

EXAMPLES

1. Preparation of Acrylic Solution Polymer

The following general method was used to make solution polymers 1 to 17. The quantities of ingredients used are given in Tables 1 to 3 below and the solvent was calculated to give a polymer with a non-volatile(NV) binder solids content of 50%. The Tg of the polymers are calculated by the Fox equation.

A flask was charged with Dowanol PM (trade mark) and heated to 101° C. in the presence of a flow of nitrogen. The monomers given in Tables 1 to 3 were added over two hours. To the monomer feed was added azodiisobutyronitrile (ADIB) initiator. After a two hour feed of monomers, a spike of further ADIB was added to the reaction vessel in order to ensure full polymerisation. The reaction was allowed to react for a further hour. Typical molecular weights produced by this process are in the region 1,500 to 8,000.

2. Preparation of Dispersion Polymer 1

A mixture of 1516 parts water, 80 parts methylmethacrylate, 80 parts butyl acrylate and 2 parts Aerosol OT 75 (a sodium salt of dioctyl sulphosuccinate available from Cytec) surfactant were heated to 70° C. for about 30 minutes, with a flow of nitrogen to remove the oxygen from the reaction vessel. The reaction initiator ammonium persulphate, 1 part, and water, 12 parts, were then added to the reaction vessel, and the mixture was heated for a further 30 minutes.

A main monomer feed comprising 522.1 parts methylmethacrylate, 634.8 parts butylacrylate, 29.7 parts propyl trimethoxy silane methacrylate (available from OSi Specialities), and 6.4 parts Aerosol OT were added over three hours while maintaining the temperature at 70° C. Simultaneously, a separate feed of 4 parts ammonium persulphate in 80 parts water was added to the reactor.

The preparation was heated for a further hour, then allowed to cool and filtered. The resulting dispersion had a NV solids content of 45%, a Tg of −5° C., a silane monomer content of 2.2%, and a particle size of 166 nm as measured by a Malvern Autosizer 2c (Trade Mark of Malvern Instruments).

The following abbreviations are used in the Tables given below:
MMA is methylmethacrylate.
BA is butylacryl ate.
MAA is methacrylic acid.
MPTS is gamma-mercapto propyl trimethoxy silane.
ADIB is azodiisobutyronitrile.
SP is solution polymer.
DP is dispersion polymer.

TABLE 1

The silane monomer levels in the solution polymer were varied.

| Solution Polymer No. Tg = −5° C. | Parts By Weight | | | | | | | |
|---|---|---|---|---|---|---|---|---|
| | MMA | BA | Silane* Monomer | MAA | MPTS | ADIB 1 | ADIB 2 | Dowanol PM |
| 1 | 34.98 | 57.52 | 0 | 7.5 | 0 | 1.86 | 0.21 | 100 |
| 2 | 34.31 | 55.69 | 2.5 | 7.5 | 4.99 | 1.86 | 0.21 | 105 |
| 3 | 33.64 | 53.86 | 5.00 | 7.50 | 5.01 | 1.86 | 0.21 | 105 |
| 4 | 32.30 | 50.20 | 10.00 | 7.50 | 4.99 | 1.86 | 0.21 | 105 |
| 5 | 31.00 | 46.50 | 15.00 | 7.50 | 5.00 | 1.86 | 0.21 | 105 |
| 6 | 30.96 | 46.54 | 15.00 | 7.50 | 0 | 0.93 | 0.10 | 100 |
| 7 | 29.61 | 42.90 | 20.00 | 7.50 | 5.00 | 1.86 | 0.21 | 105 |
| 8 | 26.98 | 35.44 | 30.06 | 7.51 | 5.01 | 1.86 | 0.21 | 105 |

* A174, propyl trimethoxy silane methacrylate, ex OSi

TABLE 2

The MAA levels in the solution polymer were varied.

| Solution Polymer No. Tg = −5° C. | Parts By Weight | | | | | | | |
|---|---|---|---|---|---|---|---|---|
| | MMA | BA | Silane Monomer | MAA | MPTS | ADIB 1 | ADIB 2 | Dowanol PM |
| 9 | 40.67 | 44.38 | 14.95 | 0 | 5.00 | 1.86 | 0.21 | 105 |
| 10 | 37.42 | 45.08 | 15.01 | 2.50 | 5.01 | 1.86 | 0.21 | 105 |
| 11 | 34.19 | 45.79 | 15.00 | 5.00 | 5.00 | 1.86 | 0.21 | 105 |
| 12 | 21.26 | 48.72 | 15.01 | 15.01 | 5.00 | 1.86 | 0.21 | 105 |
| 13 | 1.86 | 52.85 | 15.09 | 30.19 | 5.03 | 1.87 | 0.21 | 105 |

TABLE 3

The Tg of the solution polymer was varied.

| Solution Polymer No. | Tg (°C.) | Parts By Weight | | | | | | | |
|---|---|---|---|---|---|---|---|---|---|
| | | MMA | BA | Silane Monomer | MAA | MPTS | ADIB 1 | ADIB 2 | Dowanol PM |
| 14 | −15 | 32.04 | 51.29 | 9.53 | 7.14 | 0 | 1.77 | 0.20 | 100 |
| 15 | −15 | 28.20 | 40.85 | 23.81 | 7.14 | 0 | 1.77 | 0.20 | 100 |
| 16 | −5 | 29.61 | 42.90 | 20.00 | 7.50 | 5 | 1.86 | 0.21 | 105 |
| 17 | 40 | 54.50 | 18.00 | 15.00 | 7.50 | 5 | 1.77 | 0.21 | 100 |

3. Formulation of Blends

To 16.7 parts dispersion polymer (DP) 1 was added 14.2 parts water followed by 1 part ammonia solution. To this mixture was added 15 parts of one of the solution polymers (SP) No.'s 1 to 16 given in Tables 1 to 3 above with stirring. The resulting mixture had a 1:1 weight ratio of DP:SP and a NV solids content of 32%. Pigmented systems were made by a similar method such that 14.2 parts of millbase (70% NV) was added to 16.7 parts dispersion polymer, with 32.8 parts of water and 1 part ammonium hydroxide solution. To this mixture was added 15 parts of one of the solution polymers defined. The composition had a final NV content of 32%.

To form pigmented films, pigments (eg titanium dioxide) were introduced into the coating composition by first forming a mill base or pigment dispersion with a suitable pigment dispersant polymer by conventional techniques such as high speed mixing, sand grinding, ball milling, attritor grinding or triple roll milling. The pigment dispersion may comprise an added pigment dispersant; however it is possible that the solution polymer in the composition may act as the pigment dispersant. It is therefore contemplated that the composition may comprise a reduced amount of added pigment dispersant to that which would normally be added, or may even absent altogether an added pigment dispersant. The pigment volume concentration was 14%. If the pigment is stabilized in the aqueous media by an added pigment dispersant, this could be a comb type having a hydrophobic backbone and hydrophilic pendant groups. The mill base was then blended with the other constituents used in the coating composition.

The resulting mixture was cast onto a glass panel using a 200 micron block spreader, and allowed to dry under normal conditions of temperature and humidity. The resulting films were tested for cure by rubbing with a methyl ethyl ketone soaked rag ("MEK rubs" - a standard test in the industry) and were tested for hardness (HD) using the Erichson Pendulum. In the Tables below the MEK results are the number of double rubs (ie, one upward and one downward stroke on a test panel with a methyl ethyl ketone soaked rag) required to first expose the substrate (up to a maximum of 200 strokes). The Erichson results represent the number of seconds registered by the Erichson Hardness meter per test.

TABLE 4

| Compositions containing SP No. | Clear Films | | Pigmented Films | |
|---|---|---|---|---|
| | MEK (double rubs) | HD (seconds) | MEK (double rubs) | HD (seconds) |
| 1  | 11  | 7  | 3   | 10 |
| 2  | 11  | 22 | 14  | 23 |
| 3  | 42  | 19 | 17  | 34 |
| 4  | 200 | 28 | 101 | 45 |
| 5  | 200 | 27 | 200 | 55 |
| 6  | 200 | 41 | 200 | 58 |
| 7  | 200 | 42 | 200 | 60 |
| 8  | 200 | 45 | 200 | 58 |
| 9  | —   | —  | —   | —  |
| 10 | —   | —  | —   | —  |
| 11 | 199 | 25 | 150 | 39 |
| 12 | 200 | 47 | 200 | 66 |
| 13 | 200 | 54 | 200 | 64 |
| 14 | 200 | 38 | 200 | 54 |
| 15 | 200 | 50 | 200 | 64 |
| 16 | 200 | 42 | 200 | 60 |
| 17 | 200 | 48 | —   | —  |

Table 4 shows that compositions having a NV binder solids content of 32% and a 1:1 ratio of DP:SP have excellent film properties when the silane monomer is present in an amount of 10 to 30% on the solution polymer (compare SP No's 1–3 and 4–8)and excellent film properties when the acid monomer levels are more than 2.5% (SP No's 11–17 versus 9), and are preferably at least 5%. Also it is seen that a change of the Tg of the solution polymer (14–17) from −15° to +40° C. has no significant effect on film properties. The gelation times of the compositions in Table 4 were greater than 1 day. Samples 9 and 10 would not dissolve, and hence could not be measured with the level of acid used.

Using solution polymer No. 3 in Table 1 above the effect of changing the weight ratio of dispersion to solution polymer in the composition on MEK, HD and gelation time is shown in Table 5 below:

TABLE 5

| Ratio of DP:SP (Tg = −5° C.) | MEK | HD | Molar Conc. Si | Time to gel |
|---|---|---|---|---|
| 100:0 | 13  | 9  | 0.025 | >1 day |
| 90:10 | 5   | 13 | 0.034 | >1 day |
| 80:20 | 8   | 9  | 0.047 | >1 day |
| 70:30 | 7   | 10 | 0.058 | >1 day |
| 50:50 | 42  | 19 | 0.070 | >1 day |
| 30:70 | 200 | 16 | 0.10  | >1 day |
| 20:80 | 148 | 19 | 0.11  | >1 day |
| 10:90 | 75  | 22 | 0.13  | >1 day |
| 0:100 | 72  | 15 | 0.14  | >1 day |

Table 5 shows that both excellent film properties and good pot-life are obtained when the weight ratio of DP:SP lies in the range from 30:70 to 20:80. All compositions had a NV solids content of 32%.

Using solution polymer No. 5 in Table 1 above the effect of changing the weight ratio of dispersion to solution polymer in the composition on MEK, HD and gelation time is shown in Table 6 below:

TABLE 6

| Ratio of DP:SP (Tg = −5° C.) | MEK | HD | Molar Conc. Si | Time to gel |
|---|---|---|---|---|
| 100:0 | 16  | 9  | 0.025 | >1 day |
| 90:10 | 25  | 12 | 0.046 | >1 day |
| 80:20 | 30  | 17 | 0.070 | >1 day |
| 70:30 | 139 | 19 | 0.09  | >1 day |
| 50:50 | 200 | 26 | 0.14  | >1 day |
| 30:70 | 200 | 27 | 0.18  | >1 day |
| 20:80 | 200 | 30 | 0.21  | <2 hours |
| 10:90 | 170 | 33 | 0.22  | <2 hours |
| 0:100 | 200 | 32 | 0.25  | <2 hours |

Table 6 shows that when the silane monomer is 15% by weight on the solution polymer excellent film properties and pot-life are obtained when the weight ratio of the DP:SP is from 70:30 to 30:70. All compositions had a NV solids content of 32%.

Using solution polymer No. 8 in Table 1 above the effect of changing the weight ratio of dispersion to solution polymer in the composition on MEK, HD and gelation time is shown in Table 7 below:

TABLE 7

| Ratio of DP:SP (Tg = −5° C.) | MEK | HD | Molar Conc. Si | Time to gel |
|---|---|---|---|---|
| 100:0 | 11  | 10 | 0.025 | >1 day |
| 90:10 | 64  | 19 | 0.063 | >1 day |
| 80:20 | 200 | 28 | 0.11  | >1 day |
| 70:30 | 200 | 34 | 0.14  | >1 day |
| 50:50 | 200 | 48 | 0.22  | >1 day |
| 30:70 | —   | —  | 0.30  | <2 hours |
| 20:80 | —   | —  | 0.34  | <2 hours |
| 10:90 | —   | —  | 0.35  | <2 hours |
| 0:100 | —   | —  | 0.42  | <2 hours |

Table 7 shows that when the silane monomer is present at 30% by weight on the solution polymer, both excellent film properties and pot-life are obtained when the weight ratio of the DP:SP lies in the range 80:20 to 50:50. All compositions had a NV solids content of 32%.

The 30:70 to 0:100 compositions could not be measured for their MEK and HD values, due to rapid gelation.

A test in which the molecular weight of the solution polymer was changed from 1,500–8,000 to 140,000 showed that changing the molecular weight had little effect on the MEK and HD tests with pigmented films.

4. Preparation of Dispersion Polymer 2 Having a Tg of 20° C., 0.1% wt. Acid Functionality and 2.2% wt. Silane Monomer A mixture of 2041 parts water, 107.68 parts methylmethacrylate, 107.68 parts butyl acrylate and 2.68 parts Aerosol OT surfactant were heated to 70° C. for 30 minutes, with a flow of nitrogen to remove the oxygen from the reaction vessel.

1.36 parts of the reaction initiator ammonium persulphate (APS) and 16 parts water were added to the reaction vessel. This mixture was heated for a further 30 minutes.

The main monomer feed comprising 945.24 parts methylmethacrylate, 598.16 parts butylacrylate, 39.69 parts silane monomer A174 (propyl trimethoxysilane methacrylate, available from OSi Specialities), 18.16 parts methacrylic acid, and 8.6 parts Aerosol OT was added over three hours while maintaining the temperature at 85° C. Simultaneously, a separate feed of 5.4 parts APS in 107.68 parts water was put into the reactor.

After the feed monomers were added the preparation was heated for a further hour and then allowed to cool and filtered. The latex had a NV solids content of 45% and a particle size of 188 nm.

The resultant latex was blended with solution polymer 17 (Tg 40° C.) in a 1:1 weight ratio.

5. Preparation of Dispersion Polymer 3 Having 2.25% wt. Silane Monomer and a Tg of −5° C. Where a Non-Ionic Stabiliser and a Redox Initiator are Used A mixture of 616.74 parts water, 32 parts methylmethacrylate, 32 parts butyl acrylate and 9 parts nonylphenolpolyethyleneoxide (commercially available as Levelan P208 from Lankro Chemicals) were heated to 50° C. for 30 minutes with a flow of nitrogen to remove the oxygen from the reaction vessel.

The reaction initiator ascorbic acid (Aldrich), 1 part, and 5 parts water were added to the reaction vessel followed by an addition of a solution of 0.1 parts hydrogen peroxide (100 Vol) and 5 parts water. This mixture was heated for a further 30 minutes.

The main monomer feed comprising 237 parts methylmethacrylate, 288.12 parts butylacrylate, 13.5 parts A174, and 18 parts nonylphenolpolyethyleneoxide was added over three hours while maintaining the temperature at 50° C.

Simultaneously, two separate feeds of 1 part ascorbic acid in 60 parts water, and 1 part hydrogen peroxide in 60 parts water were put into the reactor.

After the feed monomers were added the preparation was heated for a further hour, then allowed to cool and filtered. The latex had a NV solids content of 45% and a particle size of 148 nm.

The resultant latex was blended in a 1:1 ratio with solution polymer 5.

6. Preparation of Dispersion Polymer 4 Having a Tg of −20° C., 1.0% wt. Acid Functionality and 2.0% wt Silane Monomer A mixture of 1602 parts water, 80 parts butylacrylate and 2 parts Aerosol OT were heated to 70° C. for 30 minutes with a flow of nitrogen to remove the oxygen from the reaction vessel.

The reaction initiator, 1 part, and 12 parts of water were added to the reaction vessel. This mixture was heated for a further 30 minutes.

The main monomer feed comprising 359.1 parts methylmethacrylate, 829.8 parts butylacrylate, 27.8 parts A174, 13.9 parts methacrylic acid and 6.4 parts Aerosol OT were added over three hours while maintaining the temperature at 70° C. Simultaneously, a separate feed of 4 parts APS in 80 parts water was put into the reactor.

After the feed monomers were added the preparation was heated for a further hour, then allowed to cool and filtered. The latex had a NV solids content of 45%.

The resultant latex was blended with solution polymer 5.

The MEK, HD and pot-life of the blends are given in Table 8 below:

TABLE 8

| Dp No. | Sp No. | MEK | HD | Time for Gelation |
|---|---|---|---|---|
| 2 | 17 | 200 | 71 | >1 day |
| 3 | 5 | 200 | 16 | >1 day |
| 4 | 5 | 200 | 31 | >1 day |

3. Preparation of Dispersion Polymer 5

A dispersion polymer composition 5 was prepared according to first polymer 2 composition of EP 5,067 (Imperial Chemical Industries plc). Thus, the following solutions were prepared and blended according to the following protocol:

| Solution | | Weight |
|---|---|---|
| A: | Water | 530.00 |
| | "Levelan" P208 | 8.5 |
| | Sodium bicarbonate | 2.03 |
| B: | Methyl methacrylate | 33.8 |
| | Butyl acrylate | 27.5 |
| C: | Water | 6.75 |
| | t-butyl hydroperoxide | 0.24 |
| D: | Water | 12.00 |
| | Sodium Metabisulphate | 0.48 |
| E: | Water | 6.00 |
| | Sodium Metabisulphate | 0.24 |
| F: | Water | 6.80 |
| | Ammonium persulphate | 1.35 |
| G: | Methyl methacrylate | 304.4 |
| | Butyl acrylate | 244.4 |
| | "Levelan" 208 | 9.70 |
| | Stabiliser Precursor | 31.90 |
| | 3 (trimethylsilyl) propyl methacrylate | 15.6 |
| H: | Water | 38.25 |
| | Sodium Metabisulphite | 1.53 |
| I: | Water | 5.40 |
| | Ammonium persulphate | 0.69 |
| J: | Water | 19.00 |
| | Sodium Metabisulphite | 0.76 |
| K: | Water | 7.02 |
| | Metacide 300 (commercial antifungal agent) | 1.76 |

Method of Preparation (A) was charged into a 2 litre flask fitted with a reflux condenser, a thermometer and a stirrer. The mixture was warmed to 50° C. and charge (B) was added. The contents were stirred for 10 minutes to emulsify the acrylic monomers. Charged (C) was added, followed by 10 min stirring. (D) was then added and the temperature was raised to 60° C. (E) was added, followed by 20 minutes stirring, during which time a prepolymer seed was formed, consisting of particles of number average diameter 75 nm.

Charge (F) was added, followed immediately by the dropwise and concurrent addition of (G) and (H) over a period of 150 minutes. Stirring was continued for a further 10 minutes and charged (I) was added in one portion followed immediately by (J), dropwise over 30 minutes, The mixture was stirred for 20 minutes and cooled to below 30° C. when (K) was added, followed by 10 minutes stirring.

The resulting mixture was filtered, giving a stable colloidal dispersion of pH 6.4, 50% solids, a silicon content of 0.28% by weight, a Tg of 10° C. as calculated by the Fox equation and a number average diameter as measured on a Malvern Zetasizer (available from Malvern Instruments, England) of 170 nm.

4. Preparation of Solution Polymer 18

Solution polymer 18 is an acrylic polymer made using an acid functional monomer and a silane functional monomer, prepared as described in relation to second polymer 5 in EP 485,067 (Imperial Chemical Industries Plc).

A 3 litre resin flask fitted with a stirrer, a thermometer, a reflux condenser, a nitrogen inlet and a heating mantle was charged with 667 g of 1-methoxy-2-hydroxypropane and heated to 110° C. with stirring and nitrogen bubbling through at the rate of 1 ml per second. A mixture of 393 g methylmethacrylate, 371 g butylacrylate, 36 g acrylic acid, 50 g tertiary butyl peroxy-2-ethyl hexanoate and 200 g 3(trimethoxysilyl) propyl methacrylate was added dropwise over 3 hours via a mechanical pump. The temperature of the mixture was maintained at 105°–110° C. throughout the duration of the feed. The mixture was further stirred for 15 minutes. 10 g teriary butyl peroxy-2-ethyl hexanoate was added in 6 portions over 1 hour. The mixture was stirred for a further 15 minutes before it was allowed to cool to room temperature.

Solution Polymer 19

Solution polymer 19 was manufactured according to the same method and composition as solution polymer 7 in table 1 above, only with the 5.00 parts of MPTS replaced by 5.00 parts of octyl mercaptan.

Blends

Blends were prepared as described below which contain essentially similar levels of silicon, but the blends have been made by different routes, and then cast over glass panels using a 200 μm block spreader. The resulting films were examined for solvent resistance using the method described above ("MEK rubs").

Blend 1

Blend 1 was prepared by mixing dispersion polymer 5 described above with solution polymer 18 as described above, in a ratio such their non-volatile contents are 1:1. The composition had a total non-volatile content of 35%.

To effect the blending, the solution polymer is neutralised by adding to the solution at room temperature sufficient ammonium hydroxide solution to fully neutralise the acid functionalities. This was followed by 6% (by weight of non-volatile content) nonyl phenol polyethyleneoxide, and then a sufficient amount of water to afford a NV content of 31%. The solution was then allowed to stand for three days, and was then blended with dispersion polymer 5 to afford a solution with 35% non-volatile content.

(Blend contents; dispersion polymer 5 10 g, water 2.44 g, solution polymer 18 16.13 g.)

Blend 2

This composition was made according to this invention. Dispersion polymer 5 (10 g) was mixed with water (8.2 g) and ammonia solution (0.41 g). To this mixture, solution polymer 19(10 g) as described above was blended to afford a 35% NV coating with a solution dispersion ratio of 1:1.

Blend 3

This composition was made in the same way as Blend 2, but solution polymer 7 was used instead of solution polymer 19.

The solutions were made up and a set of films cast. These were left for 24 hours, then examined for their solvent resistance by the MEK rub test.

| Results | | |
|---|---|---|
| Blend | MEK rubs | Comments |
| 1 | 17 | Poor crosslinking |
| 2 | 200 | Excellent cure |
| 3 | 200 | Excellent cure |

These results show the benefit of mixing together the solution and dispersion polymers just prior to application, and of protecting the solution polymer from exposure to water until it is mixed with the dispersion polymer. In particular, blend 1 represents a composition according to the prior ICI patent application EP 485,067 discussed above which has been aged for a period of time in water and can be considered to be a prior art comparative composition, whereas blends 2 and 3 represent compositions according to the invention, where the solution polymer is retained in a non-aqueous environment until mixing with the aqueous dispersion polymer. For blends 2 and 3, blending the solution polymer and dispersion polymers just prior to use gives the full potential of silane cross linking, whereas blend 1 clearly has inferior solvent resistance to blends 2 and 3.

Blends 4 & 5

Blends 4 and 5 were prepared to demonstrate the utility of the invention with cationic solution polymers.

Solution Polymer 20

Solution polymer 20 was prepared in accordance with the second polymer 1 example in EP-A-485,057 (Imperial Chemical Industries plc). This solution polymer is an epoxy derived polymer which is the product of reaction between a bisphenol A/Ephichlorohydrin type epoxy resin and an aminosilane.

a) Preparation of Non-aqueous Solution Polymer 20

Epikote 880 (a bisphenol A/Epichlorohydrin type epoxy resin of equivalent weight 192 from Shell Chemicals, 106.5 g) was mixed with N-methylaminopropyltrimethoxysilane (127 g) and Dowanol PM (dipropyleneglycolmonomethylether from Dow Chemicals; 80 g) at 25° C. with stirring under nitrogen. Stirring was continued for 1 hour, the temperature was raised to 50° C. and the mixture was stirred for 3 hours. The resulting polymer had a weight average molecular weight of 1,700 and a final solids content of 74.4%, with a calculated silicon content of 7.3% by weight.

b) Preparation of Aqueous Solution Polymer

The resulting mixture was cooled to 25° C. and a portion (239 g) was mixed with glacial acetic acid (25 g), followed by slow addition of water (1424 g) over 5 minutes with rapid stirring. The product was an aqueous solution which was clear to the unaided eye and which was stable on storage at ambient temperature for over one year. This aqueous solution concentration represents the maximum possible without the loss of chemical stability.

The dispersion polymer used in blends 4 and 5 was dispersion polymer 3 described above.

Blend 4

Blend 4 in essence corresponds to a composition according to EP-A-485,057 (Imperial Chemical Industries plc). Hence 17.7 g of dispersion polymer 3 was combined with 20.0 g of aqueous cationic solution polymer 20. The final composition has NV content of 26.6% and was pot stable for more than 5 days. The molar concentration of silane in the polymer was 0.15.

Blend 5

Blend 5 represents a cationic polymer mixture according to the invention. Hence, 17.7 g of dispersion polymer 3 was added to a mixture of 1.6 g water and 0.24 g acetic acid. Subsequently 2.75 g of non-aqueous solution polymer 20 was added to this mixture with stirring. The resulting composition has a NV content of 46.6%, and a molar concentration of 0.25. The sample gelled within 24 hours.

Both blends were cast over a glass panel with a 400 μm spreader, and examined for hardness and solvent resistance.

Blend 4 provided a good film and withstood more Blend 5 likewise provided a good film, and resisted more than 200 MEK double rubs. The film has a hardness of 11 seconds.

These results show that the two pack version (blend 5) can be applied at a higher solids level and higher molar concentration of silicon, but provides a composition with a shorter pot life.

Blend 6 Microgel Latexes

To a microgelled latex as described in example 24 of EP-A-300,612 (Imperial Chemical Industries plc), 10 g at 23% NV was added 3.5 g water and 0.75 g ammonium hydroxide solution, and mixed. To this mixture was added 10.72 g of solution polymer 7 as described above (ie containing 20% A174) with mixing. The resultant blend had a NV content of 32% and a solution polymer:dispersion polymer ratio of 7:3. The resultant composition had a molar concentration of silicon of 0.26.

Once mixed, the sample was cast onto a glass panel with a 200 μm block spreader and allowed to dry under normal conditions of temperature and humidity. The sample had a usable pot life of less than two hours and the cast films were left overnight before testing to afford an Erichson hardness of 50 seconds and MEK rub value of 130. This example demonstrates that silane functionality in the dispersion polymer is not essential, and also that satisfactory coating compositions can be made using microgel dispersion polymers.

Blend 7—Epoxy Resin Addition 13.5 g of solution polymer 7 as described above was mixed with 1.5 g Epikote 880 (ex Shell). The mixture was then added to a mixture of 16.39 dispersion polymer 3 as described above, 14.2 g water and 1 g ammonium hydroxide solution. The resultant blend had a final solids content of 32% NV and a solution polymer:dispersion polymer ratio of 1:1.

The resultant blend was cast onto a glass panel in the conventional manner. The film had solvent resistance of 200 MEK double rubs, and an Erichson hardness of 20 seconds. In addition, this composition showed good performance in water resistance tests. This example therefore demonstrates that epoxy resins can be satisfactorily added to two pack systems according to the invention, to provide improved water resistance. Certain preferred embodiments of the invention additionally comprise at least 5% by weight of epoxy resin in the solution polymer.

Blend 8 GMA Functional Latex

To a glycidyl functional latex as defined in EP-A-300,612 example 1.2 (10 g at 30% NV) was added water (6.5 g) and ammonium hydroxide solution (0.75 g), and mixed. To this mixture 14 g of solution polymer 7 (containing 20% A174) was added, and mixed. The resultant blend had a NV content of 32% and a solution polymer: dispersion polymer ratio of 7:3. The composition had a molar concentration of 0.26. The composition had a pot life of about 2 hours, and when assessed as described above, had a solvent resistance of 200 MEK rubs and an Erichson swing hardness of 36 seconds.

5. Preparation of Other Silane Functional Solution Polymers

Isocyanate Terminated Polyurethane

A mixture of 42 parts of dimethylol propionic acid, 319.55 parts of Oxylfex resin (S1015-120, ex. Occidental Co.) was heated to 80° C. until a clear solution was obtained. The solution was allowed to cool to 50° C., and then 338.34 parts of Desmodur W resin (ex. Bayer), and 0.18 parts of tin octoate were added. The resulting mixture was maintained at a temperature of 90° C. for one hour. Then a further 0.02 parts of tin octoate was added, and the mixture was heated for a further hour.

Silane Functional Polyurethane 300 parts of the isocyanate terminated polymer made above was heated to 58° C., and 198 parts of N-methyl aminopropyltrimethoxy silane (ex. Huls Corporation) was added over a period of 20 minutes. The reactants were allowed to stir for a further hour. Then, 125 parts of Dowanol PM was added to afford a solution polymer of 80% NV.

Other patents which describe the composition and synthesis of polyurethane polymers include U.S. Pat. No. 3,941,733 (3M), U.S. Pat. No. 3,983,291 (3M), and EP-A-485,067 (Imperial Chemical Industries plc).

Preparation of Silane Functional Polyesters

Unsaturated Polyester 38.5 parts of Dianol 33 (a bisphenol A propylene oxide adduct ex. Akzo Chemicals), 1 part of trimethylol propane, 11.4 parts maleic anhydride, 0.013 parts Fascat 4101 (catalyst, ex. M&T Chemicals UK) and 5 parts of xylene were mixed and heated to about 90° C. The water evolved was collected using a Dean Stark apparatus.

When the resulting unsaturated polyester polymer had an acid value of 22 mg KOH, the heat was removed and on cooling to 80° C., 24.5 parts xylene and 24.5 parts Dowanol PM were added.

The solvent was removed under reduced pressure, and replaced with 54 parts of Dowanol PM, to afford a solids content of 60%.

Silane Functional Polyester 75 parts of N-methyl aminopropyltrimethoxy silane was added with stirring to 253 parts of the unsaturated polyester mixture described above. This was allowed to stand at ambient temperature for 7 days. The resulting polymer had a number average molecular weight of 8,129.

I claim:

1. A water-based coating composition in two pack form adapted to be mixed together to form a crosslinking coating composition, comprising:

i) a first pack of a non-aqueous solution containing a water-miscible organic solvent with less than 5% by weight of water of a silicon-containing polymer having water-solubilising groups and selected from the group consisting of acrylic, vinyl other than acrylic, epoxy, polyurethane, polyester and mixtures thereof which provides a solution polymer, the solution polymer being soluble in aqueous media, the silicon groups on the solution polymer being of the formula (1):

in which a is 0 to 2, $R^1$ is C 1–6 alkyl and R is OH or a hydrolysable group, and ii) a second pack of a dispersion polymer selected from the group consisting of acrylic, vinyl other than acrylic, epoxy, polyurethane, polyester and mixtures thereof in dispersion in an aqueous liquid carrier for the dispersion polymer and the coating composition, where the first pack and second pack are adapted to be mixed together in use to form a crosslinking aqueous coating composition of the solution polymer and the dispersion polymer, where the non-volatile binder solids content of the coating composition is at least 5% by weight and the molar concentration of silicon in the composition is greater than 0 and less than 0.5.

2. A coating composition according to claim 1 wherein the molar concentration of silicon is at least 0.02.

3. A coating composition according to claim 2 wherein the molar concentration of silicon is from 0.1 to 0.4.

4. A coating composition according to claim 1, wherein R is predominantly hydrolysable alkoxy groups.

5. A coating composition according to claim 4, wherein the hydrolysable alkoxy groups are ethoxy or methoxy groups.

6. A coating composition according to claim 1, wherein the solution polymer has a silicon content of 0.5–8% by weight of silicon.

7. A coating composition according to claim 6, wherein the solution polymer has a silicon content of 1–4% by weight of silicon.

8. A coating composition according to claim 1, wherein the dispersion polymer has a silicon content of up to 1% by weight.

9. A coating composition according to claim 8, wherein the dispersion polymer has a silicon content in the region 0.05–0.5% by weight.

10. A coating composition according to claim 1, wherein the solution polymer and dispersion polymer are present at a weight ratio in the region 20:1 to 1:20.

11. A coating composition according to claim 10, wherein the solution polymer:dispersion polymer weight ratio is in the region 4:1 to 1:2.

12. A coating composition according to claim 1, wherein the non-volatile content of the coating composition is greater than 10%.

13. A coating composition according to claim 12, wherein the non-volatile content of the coating composition is greater than 20%.

14. A coating composition according to claim 1, wherein the non-volatile content of the coating composition is less than 95%.

15. A coating composition according to claim 14, wherein the non-volatile content of the coating composition is less than 70%.

16. A coating composition according to claim 1, wherein the water solubilising groups in the solution polymer are any one of anionic, cationic, or nonionic groups, in sufficient amounts to render the solution polymer soluble in the aqueous media.

17. A coating composition according to claim 16 wherein the water solubilising groups on the solution polymer are both anionic and nonionic groups.

18. A coating composition according to claim 16 wherein the water solubilising groups on the solution polymer are both cationic and nonionic groups.

19. A coating composition according to claim 1, wherein the dispersion polymer is internally cross linked.

20. A coating composition according to claim 1, wherein the second pack additionally comprises up to 10% by weight of the dispersion polymer of the solution polymer.

21. A coating composition according to claim 1, wherein the dispersion polymer is in the form of a microgel.

22. A coating composition according to claim 1, additionally comprising at least one member selected from the group consisting of curing agents, catalysts, pigments, thickeners, fillers, biocides, surfactants, dispersants, solvents, other film forming polymers and UV stabilizers.

23. A coating composition according to claim 1, wherein the coating composition is a clear coat, top coat, base coat, or primer composition.

24. A coating composition according to claim 23 which is a clear coat composition having non-volatile binder solids content of from 30–80% by weight.

25. A coating composition according to claim 23 which is a primer composition having a non-volatile binder solids content of from 10–70% by weight.

26. A coating composition according to claim 1, wherein the solvent for the solution polymer contains a water soluble alcohol.

* * * * *